United States Patent
Li

(10) Patent No.: US 9,578,320 B1
(45) Date of Patent: Feb. 21, 2017

(54) METHODS AND APPARATUS FOR DEFECT CORRECTION IN IMAGE SENSOR OUTPUTS

(71) Applicant: MARVELL INTERNATIONAL LTD., Hamilton (BM)

(72) Inventor: Huai Dong Li, Cupertino, CA (US)

(73) Assignee: Marvell International Ltd. (BM)

( * ) Notice: Subject to any disclaimer, the term of this patent is extended or adjusted under 35 U.S.C. 154(b) by 37 days.

(21) Appl. No.: 14/569,868

(22) Filed: Dec. 15, 2014

Related U.S. Application Data

(60) Provisional application No. 61/923,345, filed on Jan. 3, 2014.

(51) Int. Cl.
| | | |
|---|---|---|
| *H04N 17/00* | (2006.01) | |
| *H04N 9/04* | (2006.01) | |
| *H04N 9/64* | (2006.01) | |
| *H04N 9/73* | (2006.01) | |

(52) U.S. Cl.
CPC .................................. *H04N 17/002* (2013.01)

(58) Field of Classification Search
CPC ........ H04N 9/045; H04N 9/646; H04N 9/735; H04N 17/002
See application file for complete search history.

(56) References Cited

U.S. PATENT DOCUMENTS

| | | | | |
|---|---|---|---|---|
| 2009/0129695 A1* | 5/2009 | Aldrich | ................ | H04N 9/045 382/261 |
| 2013/0162871 A1* | 6/2013 | Bosco | ................ | H04N 5/2176 348/246 |
| 2013/0229531 A1* | 9/2013 | Zhang | ................ | H04N 17/002 348/187 |
| 2013/0321674 A1* | 12/2013 | Cote | ................ | H04N 9/64 348/242 |
| 2013/0321675 A1* | 12/2013 | Cote | ................ | H04N 9/64 348/242 |
| 2013/0321679 A1* | 12/2013 | Lim | ................ | H04N 5/23229 348/256 |
| 2015/0296193 A1* | 10/2015 | Cote | ................ | H04N 9/646 382/167 |

\* cited by examiner

*Primary Examiner* — Brian Yenke
*Assistant Examiner* — Sean Haiem

(57) ABSTRACT

Apparatus, methods, and other embodiments associated with correcting defects in an image sensor output are described. According to one embodiment, an imaging device includes image sensor array logic, calibrated noise logic, and defect logic. The image sensor array logic is configured to generate an image array of output pixels in a Bayer pattern. The calibrated noise logic is configured to generate a noise estimate for each pixel. The defect logic is configured to detect a potential defect in a pixel-under-test of the image array of output pixels based on the noise estimate.

19 Claims, 11 Drawing Sheets

METHODS AND APPARATUS FOR DEFECT CORRECTION IN IMAGE SENSOR OUTPUTS

CROSS REFERENCE TO RELATED APPLICATIONS

This patent disclosure claims the benefit of U.S. Provisional Application Ser. No. 61/923,345 filed on Jan. 3, 2014, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Image sensor arrays are formed from a grid of photo detectors/sensors. In is not uncommon to have one or more defective photo detectors that originated from the manufacturing process or became defective over the lifetime of the image sensor array. When an image sensor array outputs an image array of output pixel values, the output pixel values (corresponding detected intensities of light) for defective photo detectors will be incorrect. That is, the output pixel values for defective photo detectors in the image sensor array will not properly correspond to the intensities of light impinging on those photo detectors of the sensor array. For example, a defective photo detector may output a pixel value that is too bright (too large) or too dark (too small).

Some imaging devices (e.g., cameras) attempt to correct the output values of defective photo detectors in an image array of output pixel values. For example, some techniques generate correction factors for defective photo detectors before imaging (e.g., during a calibration process) and then apply the correction factors during imaging to correct the pixel values. However, these correction techniques have their limitations, especially in imaging devices having image sensor arrays with multiple color channels.

SUMMARY

In general, in one aspect, this specification discloses an imaging device. In one embodiment, the imaging device includes image sensor array logic configured to generate an image array of output pixels in a Bayer pattern. The imaging device also includes calibrated noise logic configured to generate a noise estimate for each pixel in the image array of output pixels. The imaging device also includes defect logic configured to detect a potential defect in a pixel-under-test of the image array of output pixel based on the noise estimate.

In general, in another aspect, this specification discloses an integrated circuit device. In one embodiment, the integrated circuit device includes defect logic configured to input a kernel of an image array of output pixels in a Bayer pattern having a pixel-under-test at a center location of the kernel. The defect logic is also configured to generate a noise estimate for each pixel in the kernel, and identify a defect in the pixel-under-test based on the noise estimate. The defect logic is further configured to correct the pixel-under-test by replacing a value of the pixel-under-test.

In general, in another aspect, this specification discloses an integrated circuit device. In one embodiment, the integrated circuit device includes defect logic configured to input a kernel of an image array of output pixels in a Bayer pattern having a pixel-under-test at a center location of the kernel. The defect logic is also configured to generate a noise estimate for each pixel in the kernel, and identify the pixel-under-test and at least one other pixel in the kernel as being defective based on the noise estimate. The defect logic is further configured to correct the pixel-under-test by replacing a value of the pixel-under-test.

In general, in another aspect, this specification discloses a method. In one embodiment, the method includes generating an image array of output pixels in a Bayer pattern, and generating a noise estimate for each pixel in the image array of output pixels. The method further includes detecting a potential defect in a pixel-under-test of the image array of output pixels based on the noise estimate.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples one element may be designed as multiple elements or multiple elements may be designed as one element. In some examples, an element shown as an internal component of another element may be implemented as an external component and vice versa.

DETAILED DESCRIPTION

Figure 1:
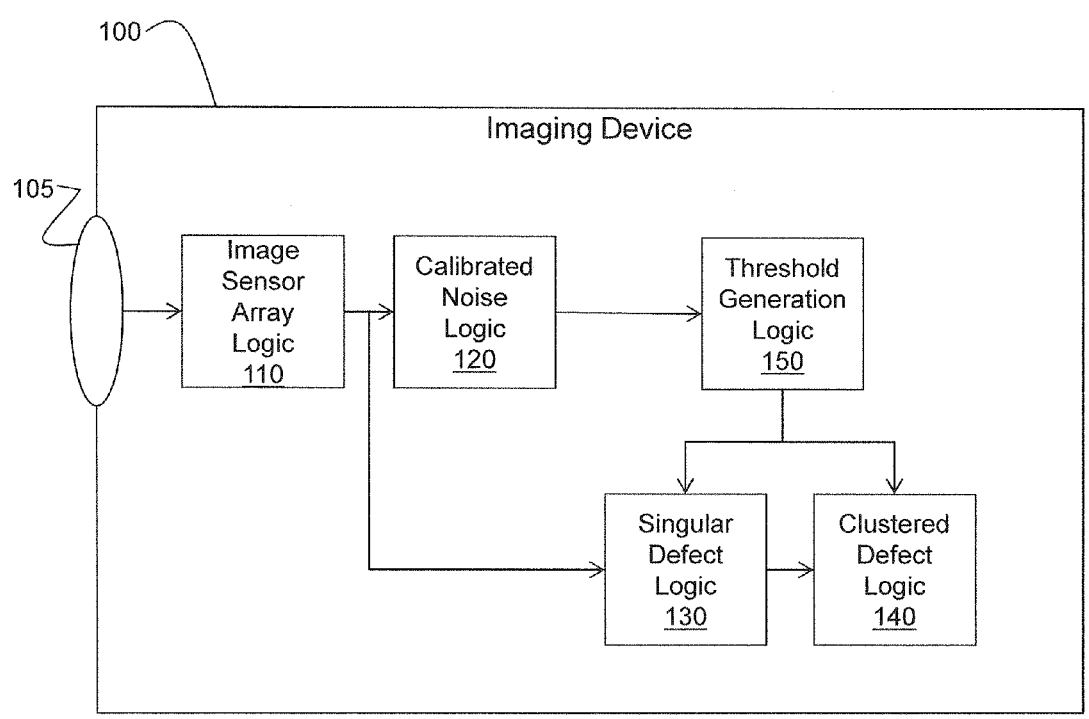
FIG. 1 illustrates one example embodiment of an imaging device configured to correct output pixel values, associated with defective photo detectors of an image sensor array of the imaging device, on-the-fly in real-time.

The following terms are used herein with respect to various embodiments.

The term "green color channels", as used herein, may refer to light green color channels, dark green color channels, or both. The term "on-the-fly in real-time", as used herein, refers to occurring during imaging device run time as images are acquired by an imaging device (e.g., a camera). The term "pixel", as used herein, means picture element and may refer to a data element generated from a photo detector of an image sensor array. The term "pixel value", as used herein, may refer to an output level of a photo detector of an image sensor array or to a value of a data element of an image array stored in a computer memory. Furthermore, the terms "pixel" and "pixel value" may be used interchangeably herein.

The term "color channel", as used herein, may refer to a hardware channel of an image sensor array logic corresponding to a color defined by a color filter of the image sensor array logic. Furthermore, the term "color channel", as used herein, may refer to a data channel of an image array stored in a computer memory. In either case, a single color channel is associated with a single pixel. The term "color channel type", as used herein, refers to a color of a color channel. When referring to multiple color channels herein, the multiple color channels may be of a same color channel type or of differing color channels types, for example.

The term "kernel", as used herein, defines a N×N (e.g., 5×5) square matrix region of pixels having a pixel-under-test at a center element of the matrix region. A defect correction process may be performed on the pixel-under-test by taking into consideration one or more pixel values within the kernel. A kernel may be moved or effectively aligned with respect to an image array of output pixels to consider different pixels as the pixel-under-test when performing a defect correction process on the image array of output pixels.

Disclosed herein are examples of apparatus, methods, and other embodiments associated with correcting defects in an image sensor output on-the-fly in real-time. That is, embodiments for performing continuous defect pixel detection and correction during the run time of a camera or other imaging device are disclosed herein. Such on-the-fly detection and correction is challenging. If not performed correctly, edges and high-frequency image content may get identified as defective pixel regions, and intact pixels may become corrupted during defect pixel replacement. A computationally efficient detection and correction method is disclosed herein which can detect a singular defect and a clustered defect reliably, while preserving the image details.

In one embodiment, the output from an image array contains red (R), light green (Gr), blue (B), and dark green (Gb) pixels arranged in an interleaving pattern. Such an interleaving pattern is often referred to as a Bayer pattern. In such an interleaving pattern, the Gr pixels share the same rows with R pixels. The Gb pixels share the same rows with the B pixels. Therefore, there are four (4) color channel types for an image array output, namely Gr, R, B, Gb color channel types. For each 5×5 kernel of an image array of output pixels, there are eight (8) surrounding pixels having the same color channel type as a center pixel of the 5×5 kernel.

In accordance with one embodiment, one characteristic of a defective photo detector in an image sensor array is that its output value (output pixel value) is significantly different than the output values of its surrounding same color channel type photo detectors. Defects corresponding to a significantly larger value than the surrounding values are referred to as bright defects. Defects corresponding to a significantly smaller value than the surrounding values are referred to as dark defects.

In one embodiment, singular defect detection, verification, and correction are performed first, followed by clustered defect detection, verification, and correction. A singular pixel defect is defined as there being only one defective pixel (associated with a defective photo detector) within the same 5×5 kernel for a same color channel type. A clustered pixel defect is defined as there being more than one defective pixel (associated with more than one defective photo detector) within the same 5×5 kernel for a same color channel type. It is to be understood herein that pixels associated with a pixel array of output pixel values may be considered for singular defects and clustered defects and corrected, in accordance with various embodiments. That is, the output values associated with defective photo detectors may be corrected. The hardware of the actual defective photo detectors is not corrected or fixed.

FIG. 1 illustrates one example embodiment of an imaging device 100 configured to correct output pixel values, associated with defective photo detectors of an image sensor array of the imaging device, on-the-fly in real-time. The imaging device 100 includes image sensor array logic 110, calibrated noise logic 120, singular defect logic 130, clustered defect logic 140, and threshold generation logic 150. In one embodiment, the imaging device 100 is implemented on a chip (i.e., a system-on-chip or SOC configuration) including one or more integrated circuits configured to perform one or more functions described herein.

In another embodiment, the imaging device 100 is implemented on several chips that are interconnected via, for example, traces on a printed circuit board (PCB). In certain embodiments, the imaging device 100 may be configured to also include discrete components such as, for example, resistors, capacitors, inductors, and transistors. In another embodiment, at least some portions of the logics of the imaging device 100 may be part of an executable algorithm, configured to perform the functions of the logics, where the algorithm is stored in a non-transitory medium.

Referring to FIG. 1, the image sensor array logic 110 is operably positioned with respect to a lens 105. The lens 105 is configured to capture and focus light toward the image sensor array logic 110. In one embodiment, the image sensor array logic 110 includes an array of photo detectors/sensors, for example, CMOS technology arranged into an array of photo detectors. Each photo detector is configured to convert impinging light (photons) from the lens 105 into electrical output signals (pixel values). Thus the array of photo detectors produces and outputs an image array of pixels that may include millions of pixels (e.g., 8 megapixels). The image sensor array logic 110 also includes color filter array (CFA) technology providing a Bayer pattern of color channels including red (R), blue (B), light green (Gr), and dark green (Gb) color channel types. The Bayer pattern of color channels is elaborated on later herein with respect to the remaining figures.

Figure 2:
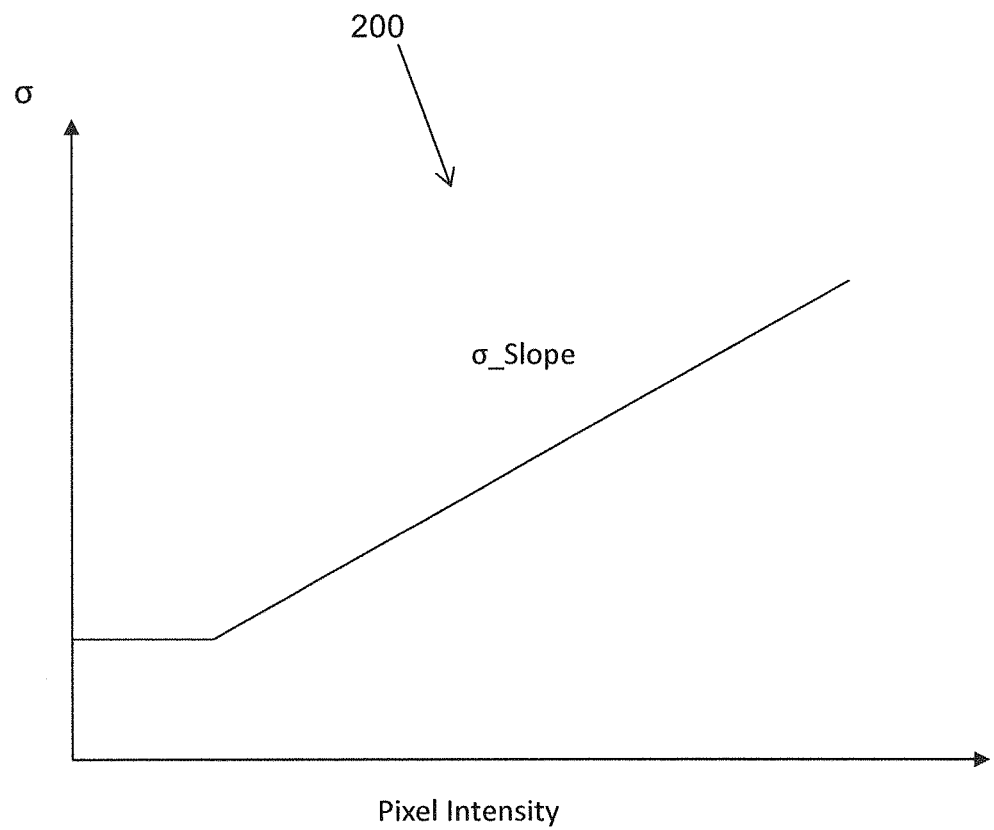
FIG. 2 illustrates an example embodiment of a graph representing a calibrated noise model implemented in the imaging device of FIG. 1.

The image sensor array logic 110 is operably connected to the calibrated noise logic 120. In one embodiment, the image sensor array logic 110 outputs an image array of output pixel values to the calibrated noise logic 120. The calibrated noise logic 120 is configured to generate a noise estimate, σ, for each pixel in the image array of output pixel values based on a calibrated noise model. FIG. 2 illustrates one example embodiment of a graph representing a calibrated noise model 200 implemented by the calibration noise logic 120 in the imaging device 100 of FIG. 1. As can be seen in the graph of FIG. 2, the noise estimate, σ, for a given pixel is dependent on the pixel intensity or pixel output value. In one embodiment, the calibrated noise model 200 is generated as part of a manufacturing process of the imaging device.

The calibrated noise logic 120 is operably connected to the threshold generation logic 150. In one embodiment, the noise estimate, σ, for each pixel of the image array of output pixel values is communicated to the threshold generation logic 150. The threshold generation logic 150 is configured to generate threshold values for each pixel based on the noise estimates. For example, in one embodiment, a threshold value $T_i$ is generated by multiplying a corresponding noise estimate, σ, by a tuning parameter, $k_i$. The tuning parameter, $k_i$, may be a constant numerical value and may be one of n tuning parameters. In one embodiment, n=4 such that four (4) threshold values are generated for each pixel and used to detect and verify pixel defects. The tuning parameters $k_i$ are generated as part of a manufacturing process of the imaging device, in accordance with one embodiment.

For an image array of output pixel values output from the image sensor array logic 110, each associated pixel may be evaluated as a pixel-under-test (PUT). Each PUT is evaluated by determining if the PUT is defective (or not defective) due to, for example, an associated defective photo detector. An associated pixel value of the PUT may be corrected upon verifying that the PUT is actually defective. Both singular pixel defects and clustered pixel defects are considered within a defined region (a kernel) around the PUT. In one embodiment, for a given PUT, singular pixel defects are considered first and clustered pixel defects are considered afterwards.

In one embodiment, the image sensor array logic 110 is also operably connected to the singular defect logic 130, and the threshold generation logic 150 is operably connected to the singular defect logic 130. The singular defect logic 130 is configured to detect a potential defect in a pixel-under-test (PUT) upon inputting a portion (e.g., a 5×5 kernel) of the image array of output pixels. Also, the singular defect logic 130 is configured to verify that the PUT is actually defective. The singular defect logic 130 is further configured to correct the PUT when the PUT is identified as being actually defective. Details of the singular defect logic 130 functions of detecting, verifying, and correcting such singular defects, using threshold values provided by the threshold generation logic 150, are elaborated on below herein with respect to the remaining figures.

In one embodiment, the singular defect logic 130 is operably connected to the clustered defect logic 140, and the threshold generation logic 150 is operably connected to the clustered defect logic 140. The clustered defect logic 140 is configured to detect at least two potential defects within the portion (e.g., the 5×5 kernel) of the image array of output pixels based on the PUT of the image array of output pixels. Also, the clustered defect logic 140 is configured to verify that the PUT and one other pixel within the portion of the image array of output pixels are actually defective. The clustered defect logic 140 is further configured to correct the PUT when the PUT and one other pixel value within the portion of the image array of output pixels are identified as being actually defective. Details of the clustered defect logic 130 functions of detecting, verifying, and correcting such clustered defects, using threshold values provided by the threshold generation logic 150, are elaborated on below herein with respect to the remaining figures.

In this manner, for a particular pixel-under-test (PUT) of an image array of output pixel values, both singular defects and clustered defects may be detected, verified, and corrected. Algorithmic details for handling singular defects and clustered defects for an image array of output pixels are provided below herein.

It is noted herein that embodiments being configured to determine that a pixel is defective (potentially or actually) are also inherently configured to determine that the pixel is not defective, and vice versa. That is, in one embodiment, a pixel may be evaluated by a positive process to determine if that pixel is defective. If the pixel passes that positive process, the pixel is considered to be defective. If the pixel fails that positive process, the pixel is considered to not be defective (i.e., has been determined to not be defective). Similarly, in another embodiment, a pixel may be evaluated by a negative process to determine if that pixel is not defective. If the pixel passes that negative process, the pixel is considered to not be defective. If the pixel fails that negative process, the pixel is considered to be defective (i.e., has been determined to be defective).

Figure 3:
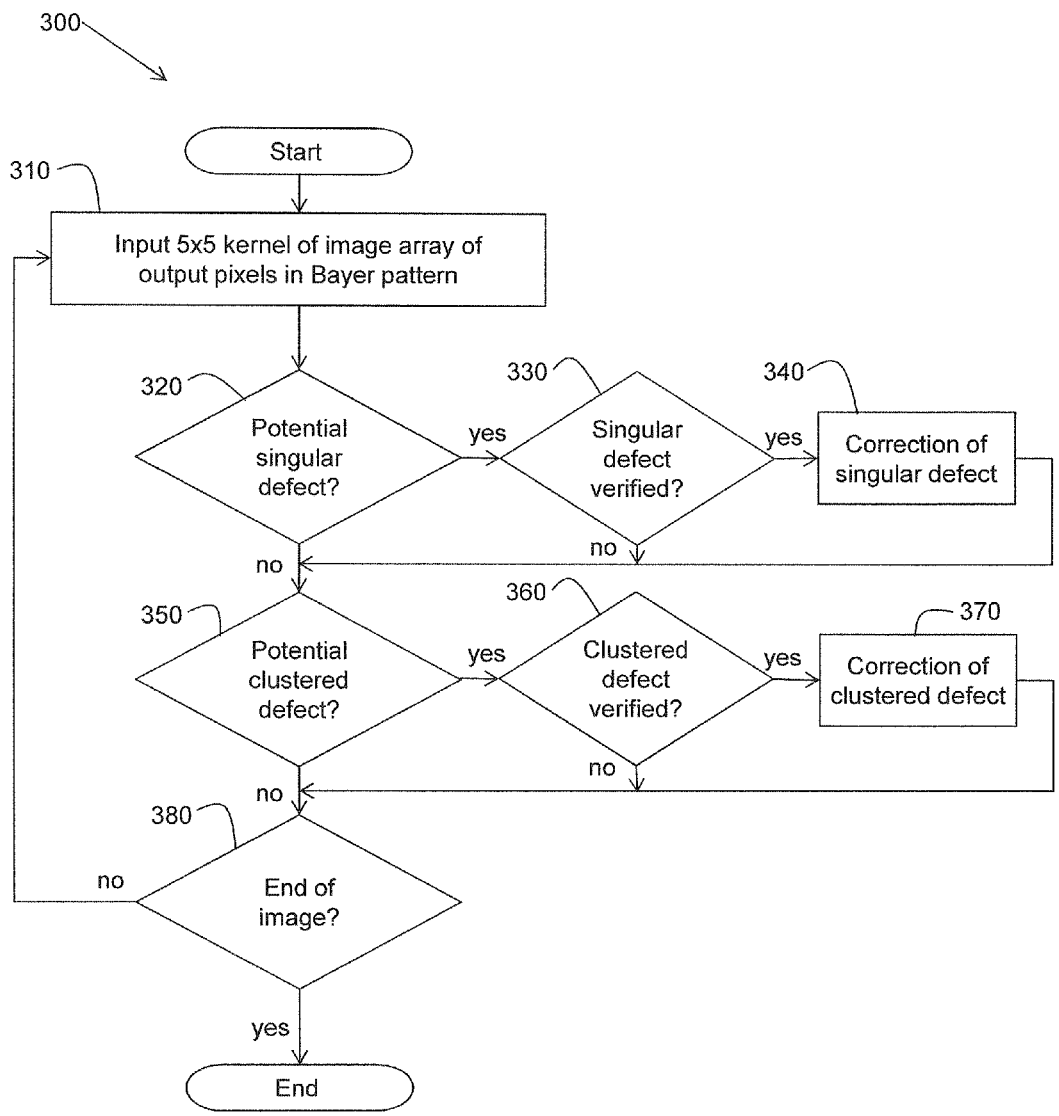
FIG. 3 illustrates one example embodiment of a method for correcting output pixel values in the imaging device of FIG. 1.

FIG. 3 illustrates one example embodiment of a method 300 for correcting output pixel values in the imaging device 100 of FIG. 1. Method 300 is implemented to be performed by the imaging device 100 of FIG. 1, or by a computing device (e.g., an integrated circuit device) configured with an algorithm of method 300. Method 300 will be described from the perspective of a pixel-under-test (PUT) being at the center of a 5×5 kernel of an image array of output pixels formatted in a Bayer pattern of color channels. Also, method 300 will be described from the perspective of being performed by the imaging device 100.

Figure 4A:
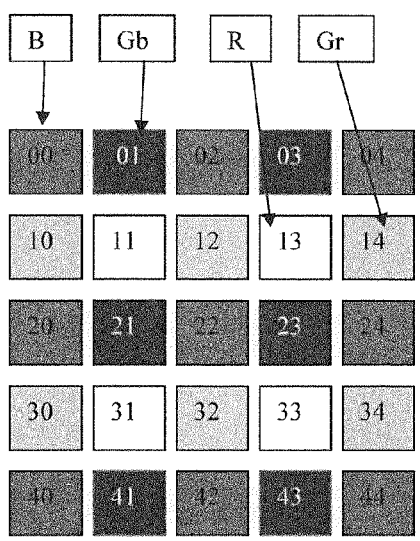
FIG. 4A illustrates a first example embodiment of a 5×5 kernel of an image array of pixels in a Bayer pattern format.
Figure 4B:
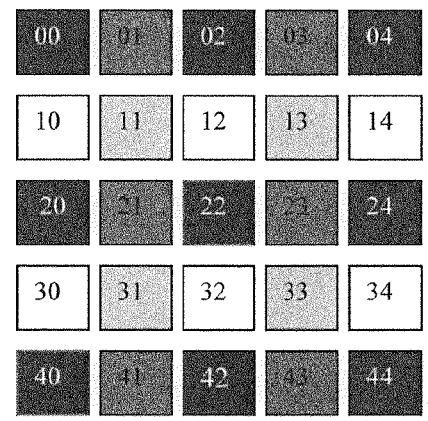
FIG. 4B illustrates a second example embodiment of a 5×5 kernel of an image array of pixels in a Bayer pattern format.

Upon initiating method 300, at 310, a 5×5 kernel of an image array of output pixels formatted in a Bayer pattern is input into the singular defect logic 130. FIG. 4A illustrates a first example embodiment of a 5×5 kernel of an image array of pixels in a Bayer pattern format. FIG. 4B illustrates a second example embodiment of a 5×5 kernel of an image array of pixels in a Bayer pattern format. The pixels of the 5×5 kernels are shown in four shades of gray, representing four different color channel types of the Bayer pattern.

In one embodiment, the four shades of gray are representative of blue (B) color channels, red (R) color channels, light green (Gr) color channels, and dark green (Gb) color channels. The Bayer pattern of the four color channel types results from a color filter array (CFA) aligned with an array of CMOS photo detectors in the image sensor array logic 110. As shown in FIGS. 4A and 4B, each pixel in the 5×5 kernels is indexed by a pair of numbers indicating a matrix position in the 5×5 kernels. For example, the center pixel (the pixel-under-test) is indexed by the pair of numbers 22 as shown in FIG. 4A and FIG. 4B. In FIG. 4A, the pixel-under-test (PUT) corresponds to a blue B color channel. In FIG. 4B, the PUT corresponds to a dark green Gb color channel.

Referring again to method 300 of FIG. 3, at 320, a determination is made as to whether the PUT in the 5×5 kernel is potentially defective. The determination is made by the singular defect logic 130 of FIG. 1. In one embodiment, the singular defect logic 130 determines a maximum pixel value ($P_{max}$) and a minimum pixel value ($P_{min}$) from eight pixels (P1-P8) within the 5×5 kernel that surround the PUT and which correspond to a same color channel type as the PUT.

In mathematical form:

$$P_{max} = \max(P1, P2, \ldots, P8);$$

$$P_{min} = \min(P1, P2, \ldots, P8).$$

Figure 5:
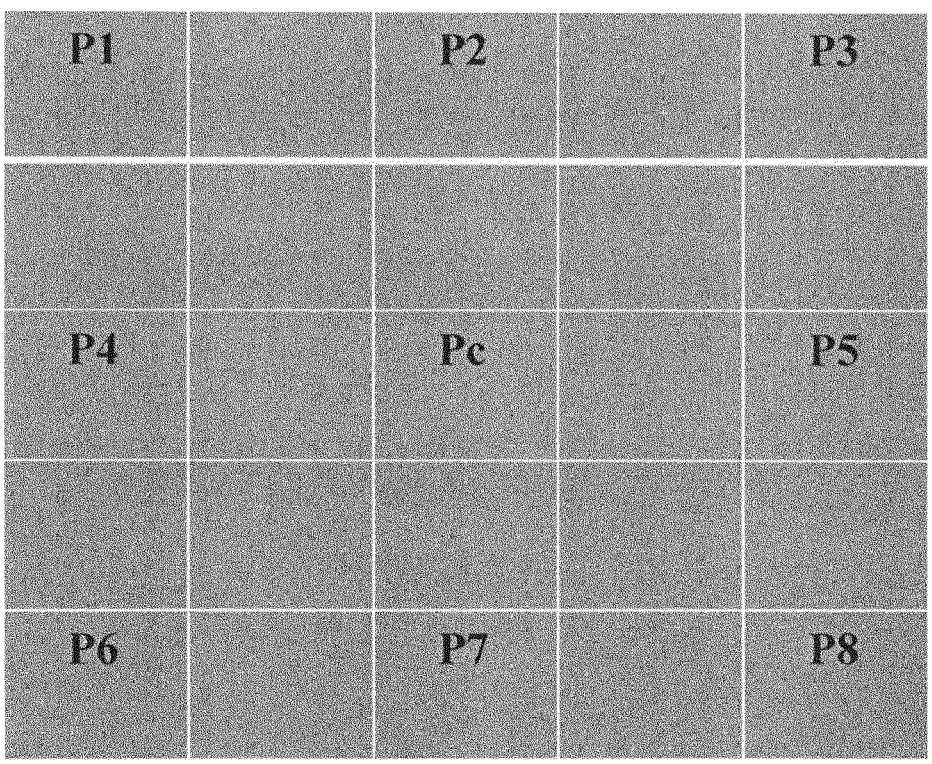
FIG. 5 illustrates an example embodiment of a 5×5 kernel of an image array of pixels for illustrating the concept of singular defect detection.

FIG. 5 illustrates an example embodiment of a 5×5 kernel 500 of an image array of pixels for illustrating the concept of single defect detection. The PUT is labeled as Pc in FIG. 5, and eight (8) surrounding pixels within the 5×5 kernel that are of the same color channel type as the PUT are labeled as P1-P8. The locations of pixels P1-P8 in the 5×5 kernel are determined by the Bayer pattern (e.g., see FIG. 4A and FIG. 4B). However, for simplicity, the various shades of gray of the Bayer pattern on not shown in FIG. 5.

In one embodiment, the singular defect logic 130 is configured to generate a first difference value by subtracting the maximum pixel value ($P_{max}$) from a value of the PUT, and a second difference value by subtracting the value of the PUT from the minimum pixel value ($P_{min}$). The singular defect logic 130 is further configured to identify the PUT as being potentially defective by determining that at least one of the first difference value and the second difference value is greater than a first threshold value $T_1$ generated by the threshold generation logic 150.

In mathematical form, the PUT is identified as being potentially defective when:

$$Pc - P_{max} > T_1 \text{ (a bright defect) or } P_{min} - Pc > T_1 \text{ (a dark defect)}.$$

The threshold $T_1$ is generated by the threshold generation logic 150 as $T_1 = k_1 \sigma$, where $\sigma$ is the noise estimate for the PUT as generated by the calibrated noise logic 120.

Referring again to method 300 of FIG. 3, at 330, when the PUT corresponds to a light green Gr (or dark green Gb) color channel (e.g., see FIG. 4B), the singular defect logic 130 is configured to verify that the PUT is actually defective (i.e., that the potential singular defect determined at 320 is not a false alarm). In one embodiment, the singular defect logic 130 is configured to generate four (4) absolute difference values by subtracting the value of the PUT from a pixel value of each of four (4) different nearest dark green Gb (or light green Gr) pixel color channels immediately surrounding the PUT within the 5×5 kernel, and taking the absolute value. For example, referring to FIG. 4B, the dark green PUT at matrix location 22 is surrounded by four (4) nearest light green pixels at matrix locations 11, 13, 31, and 33.

The singular defect logic 130 is further configured to identify the PUT as being actually defective by determining that at least three (3) of the four (4) absolute difference values are greater than a second threshold value $T_2$ generated by the threshold generation logic. That is, the light green (or dark green) PUT is identified as being actually defective when $|Pi-Pc| > T_2$, for at least three (3) of the four (4) surrounding different nearest dark green Gb (or light green Gr) pixels. This assumes that Pi is the value of one of the four different nearest dark green Gb (or light green Gr) pixels surrounding a light green Gr (or dark green Gr) PUT, Pc. The threshold $T_2$ is generated by the threshold generation logic 150 as $T_2 = k_2 \sigma$, where $\sigma$ is the noise estimate for the PUT as generated by the calibrated noise logic 120.

Referring again to method 300 of FIG. 3, at 340, when the PUT is verified as being actually defective at 330, the singular defect logic 130 is configured to correct the PUT (i.e., the value of the pixel-under-test). In one embodiment, the value of the PUT is corrected by replacing the value of the PUT with the value of $P_{max}$ when the defect is a bright defect (i.e., when $Pc - P_{max} > T_1$). The value of the PUT is corrected by replacing the value of the PUT with the value of $P_{min}$ when the defect is a dark defect (i.e., when $P_{min} - Pc > T_1$). In this manner, the output values of singularly defective pixels corresponding to light green Gr or dark green Gb color channels may be corrected.

Referring again to method 300 of FIG. 3, at 330, when the PUT corresponds to a red R or blue B color channel (e.g., see FIG. 4A), the singular defect logic 130 is configured to verify that the PUT is actually defective (i.e., that the potential singular defect determined at 320 is not a false alarm). In one embodiment, the singular defect logic 130 is configured to generate a first average value ($Avg_1$) from pixel values of four (4) nearest pixels surrounding the PUT, within the 5×5 kernel, which correspond to four (4) nearest green (light green, dark green, or both) color channels. For example, referring to FIG. 4A, the four (4) nearest green color channels are located at matrix locations 12, 21, 23, and 32.

Similarly, the singular defect logic 130 is configured to generate a second average value ($Avg_2$) from pixel values of eight (8) farthest pixels surrounding the PUT, within the 5×5 kernel, which correspond to eight (8) farthest green (light green, dark green, or both) color channels. For example, referring to FIG. 4A, the eight (8) farthest green color channels are located at matrix locations 01, 03, 10, 14, 30, 34, 41, and 43. The singular defect logic 130 is further configured to generate a bright defect difference value by subtracting the second average value ($Avg_2$) from the first average value ($Avg_1$). The singular defect logic 130 is also configured to generate a dark defect difference value by subtracting the first average value ($Avg_1$) from the second average value ($Avg2$).

In one embodiment, the singular defect logic 130 is configured to identify the PUT as being actually defective by determining that at least one of the bright defect difference value or that the dark defect difference value is less than a third threshold value $T_3$.

In mathematical form, the red R or blue B PUT is identified as being actually defective when:

$$Avg_1 - Avg_2 < T_3 \text{ or } Avg_2 - Avg_1 < T_3.$$

The threshold $T_3$ is generated by the threshold generation logic 150 as $T_3 = k_3 \sigma$, where $\sigma$ is the noise estimate for the PUT as generated by the calibrated noise logic 120.

Referring again to method 300 of FIG. 3, at 340, when the PUT is identified as being actually defective at 330, the singular defect logic 130 is configured to correct the PUT (i.e., the value of the pixel-under-test). In one embodiment, the value of the PUT is replaced by the value of $P_{max}$ when the defect is a bright defect (i.e., when $Pc - P_{max} > T_1$). The value of the PUT is replaced by the value of $P_{min}$ when the defect is a dark defect (i.e., when $P_{min} - Pc > T_1$). In this manner, the output values of singularly defective pixels corresponding to red R or blue B color channels may be corrected.

Referring again to FIG. 3, if a potential singular defect has not been detected at 320, has not been verified at 330, or has been corrected at 340, then the method 300 proceeds to 350. At 350, a determination is made as to whether at least two pixels in the 5×5 kernel are potentially defective (i.e., a clustered defect is potentially present). The determination is made by the clustered defect logic 140 of FIG. 1 using information from the singular defect logic 130.

In one embodiment, the clustered defect logic 140 is configured to determine a second largest pixel value (Pmax$_2$) and a second smallest pixel value (Pmin$_2$) from the eight (8) pixels within the 5×5 kernel that surround the PUT and which correspond to a same color channel type as the PUT.

In mathematical form:

$$Pmax_2 = max(P1, P2, \ldots, P8), \text{ excluding } P_{max};$$

$$Pmin_2 = min(P1, P2, \ldots, P8), \text{ excluding } P_{min}.$$

The clustered defect logic 140 is also configured to generate a third difference value by subtracting the second largest pixel value from the value of the PUT. The clustered defect logic 140 is further configured to generate a fourth difference value by subtracting the second largest pixel value from the maximum pixel value. The clustered defect logic 140 is also configured to generate a fifth difference value by subtracting the value of the PUT from the second smallest pixel value Pmin$_2$. The clustered defect logic 140 is further configured to generate a sixth difference value by subtracting the minimum pixel value $P_{min}$ from the second smallest pixel value Pmin$_2$.

In mathematical form:

$$\text{Third difference value} = Pc - Pmax_2;$$

$$\text{Fourth difference value} = P_{max} - PMax_2;$$

$$\text{Fifth difference value} = Pmin_2 - Pc;$$

$$\text{Sixth difference value} = Pmin_2 - P_{min}.$$

The clustered defect logic 140 is configured to identify the PUT and a first pixel corresponding to the maximum pixel value $P_{max}$ as being potentially defective by determining when the third difference value and the fourth difference value are each greater than a fourth threshold value $T_4$.

In mathematical form:

$$Pc - Pmax_2 > T_4 \text{ and } P_{max} - Pmax_2 > T_4.$$

The clustered defect logic 140 is configured to identify the PUT and a second pixel corresponding to the minimum pixel value $P_{min}$ as being potentially defective by determining when the fifth difference value and the sixth difference value are each greater than the fourth threshold value $T_4$.

In mathematical form:

$$Pmin_2 - Pc > T_4 \text{ and } Pmin_2 - P_{min} > T_4.$$

The threshold $T_4$ is generated by the threshold generation logic 150 as $T_4 = k_4\sigma$, where $\sigma$ is the noise estimate for the PUT as generated by the calibrated noise logic 120.

Figure 6:
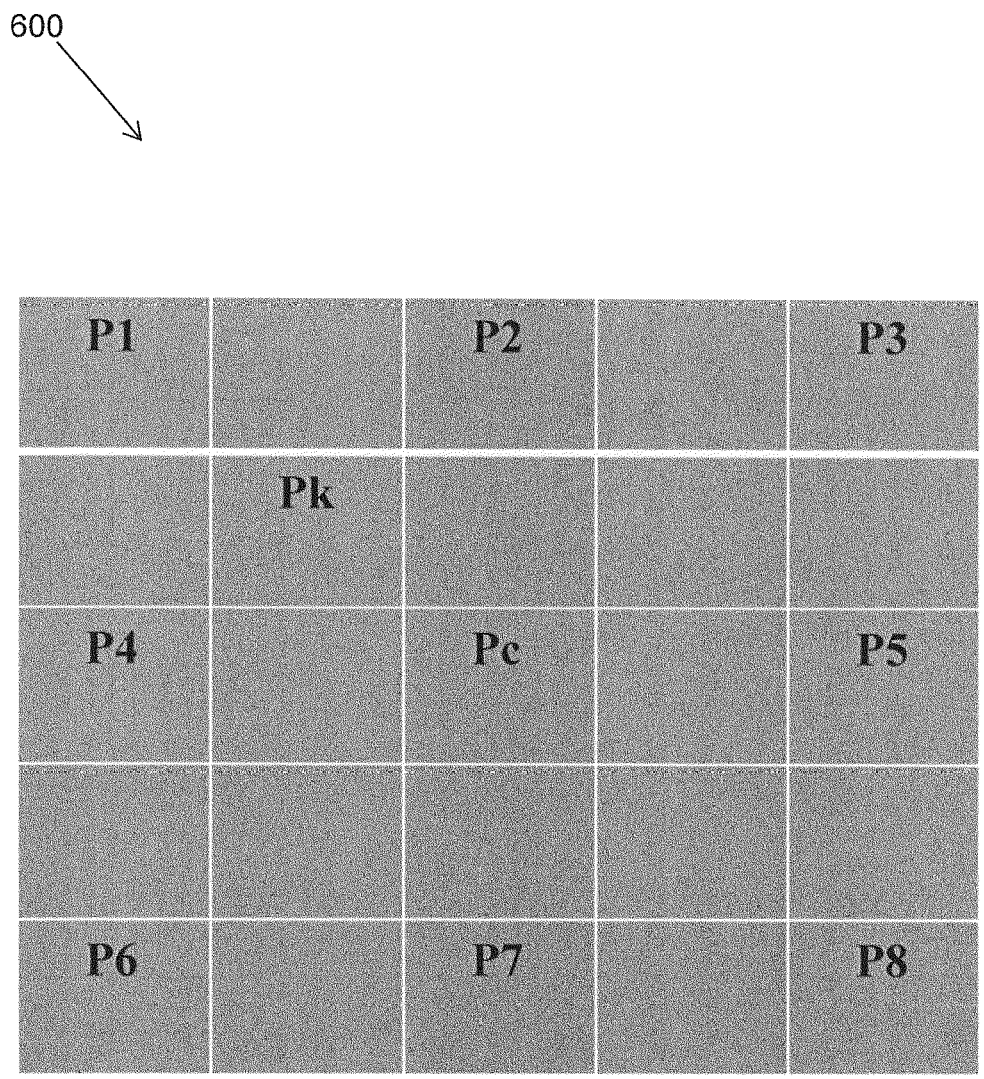
FIG. 6 illustrates an example embodiment of a 5×5 kernel of an image array of pixels for illustrating the concept of clustered defect verification.

When a potential clustered defect has been determined at 350 then, at 360, the clustered defect logic 140 is configured to verify that the PUT and one of the first pixel (corresponding to $P_{max}$) and the second pixel (corresponding to $P_{min}$) are actually defective. FIG. 6 illustrates an example embodiment of a 5×5 kernel 600 of an image array of pixels for illustrating the concept of clustered defect verification.

Referring to FIG. 6, in one embodiment, an intermediate pixel Pk is considered. The intermediate pixel Pk corresponds to a different color channel type than that of the PUT and the first and second pixels, and is located between the PUT (Pc) and one of the first pixel and the second pixel (e.g., P1 in FIG. 6) within the 5×5 kernel. Notice that Pc, Pk, and P1 appear in a straight line in FIG. 6. If the intermediate pixel Pk has previously been determined to not be defective by the singular defect logic 130, then the PUT (Pc) and the first or second pixel (e.g., P1 in FIG. 6) are verified as being actually defective. Again, it is noted herein that embodiments being configured to determine that a pixel is defective (potentially or actually) are also inherently configured to determine that the pixel is not defective, and vice versa.

Referring again to method 300 of FIG. 3, at 370, when the PUT and the first or second pixel are verified as being actually defective at 360, the clustered defect logic 140 is configured to correct the PUT (i.e., the value of the pixel-under-test). In one embodiment, the PUT is corrected by replacing the value of the PUT with the second largest pixel value Pmax$_2$, when the clustered defect is considered to be a bright clustered defect (i.e., when Pc−Pmax$_2$>T$_4$ and $P_{max}$−Pmax$_2$>T$_4$). Similarly, the PUT is corrected by replacing the value of the PUT with the second smallest pixel value Pmin$_2$, when the clustered defect is considered to be a dark clustered defect (i.e., when Pmin$_2$−Pc>T$_4$ and Pmin$_2$−$P_{min}$>T$_4$). In this manner, the output value of a defective pixel associated with a cluster of defective pixels may be corrected. In an alternative embodiment, the PUT is corrected by replacing the value of the PUT with the second smallest pixel value Pmin$_2$, when the clustered defect is considered to be a dark clustered defect (i.e., when Pmin$_2$, Pc>T$_4$ and Pmin$_2$−$P_{min}$>T$_4$).

Referring again to FIG. 3, if a potential clustered defect has not been detected at 350, has not been verified at 360, or has been corrected at 370, then the method 300 proceeds to 380. At 380, a determination is made as to whether the end of the image has been reached in the method 300. That is, a determination is made as to whether all of the pixels in the image array of output pixels have been considered as a pixel-under-test (PUT). If all of the pixels have not been considered, then method 300 reverts back to 310, where a new PUT centered within a new 5×5 kernel of the image array is considered. Otherwise, method 300 ends.

In this manner, all pixels associated with a pixel array of output pixels values may be considered for singular defects and clustered defects and may be corrected on-the-fly in real-time, in accordance with various embodiments. That is, the output values associated with, for example, defective photo detectors may be corrected. The actual defective photo detectors and/or defective associated hardware are not corrected or fixed.

Figure 7:
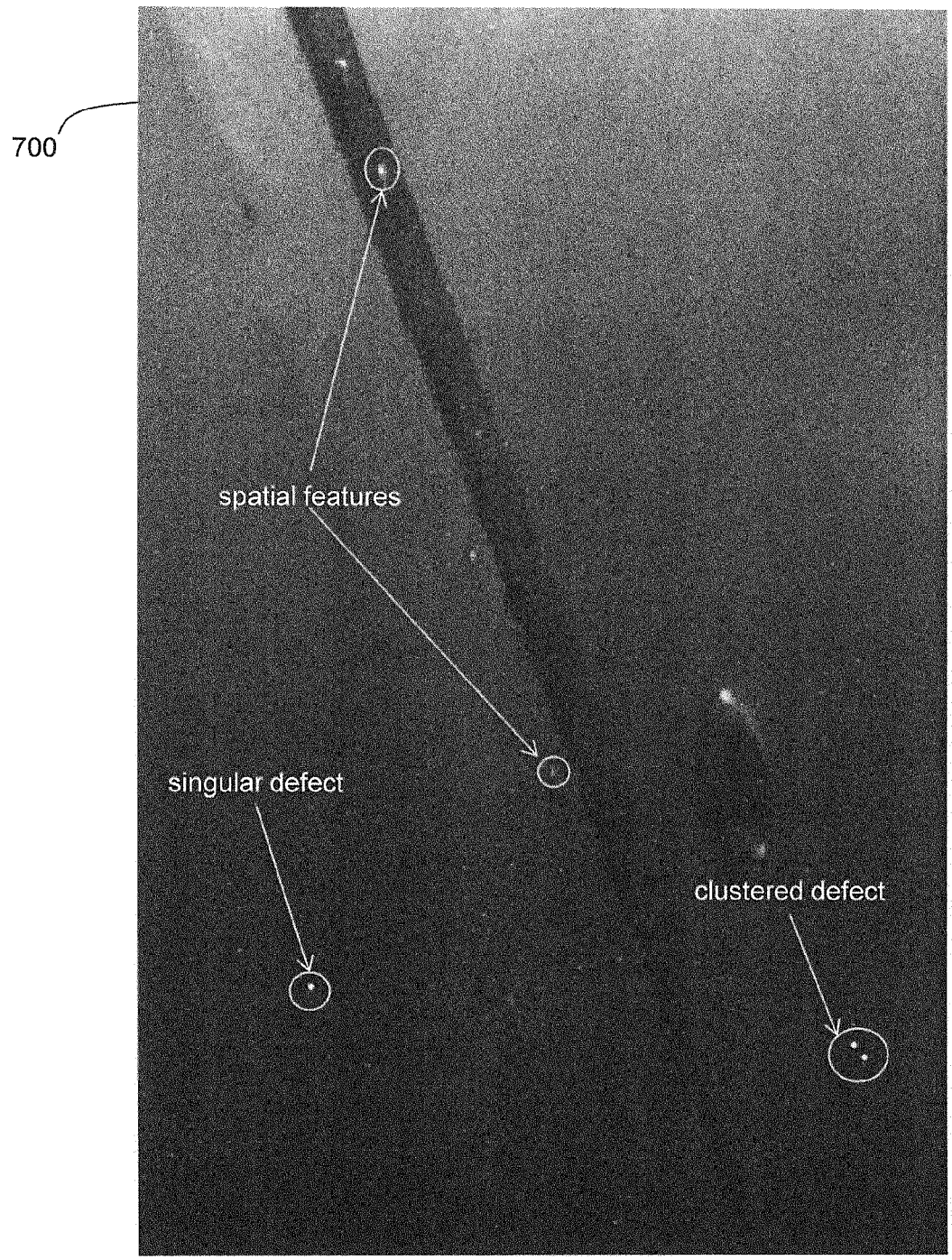
FIG. 7 illustrates an example embodiment of an image of an array of output pixels before correcting defects in the image.

FIG. 7 illustrates an example embodiment of an image 700 of an array of output pixels before correcting defects in the image. As shown in FIG. 7, the image includes uncorrupted pixels having no defects (including certain bright spatial features) as well as a corrupted pixel corresponding to a singular defect and corrupted pixels corresponding to a clustered defect.

Figure 8:
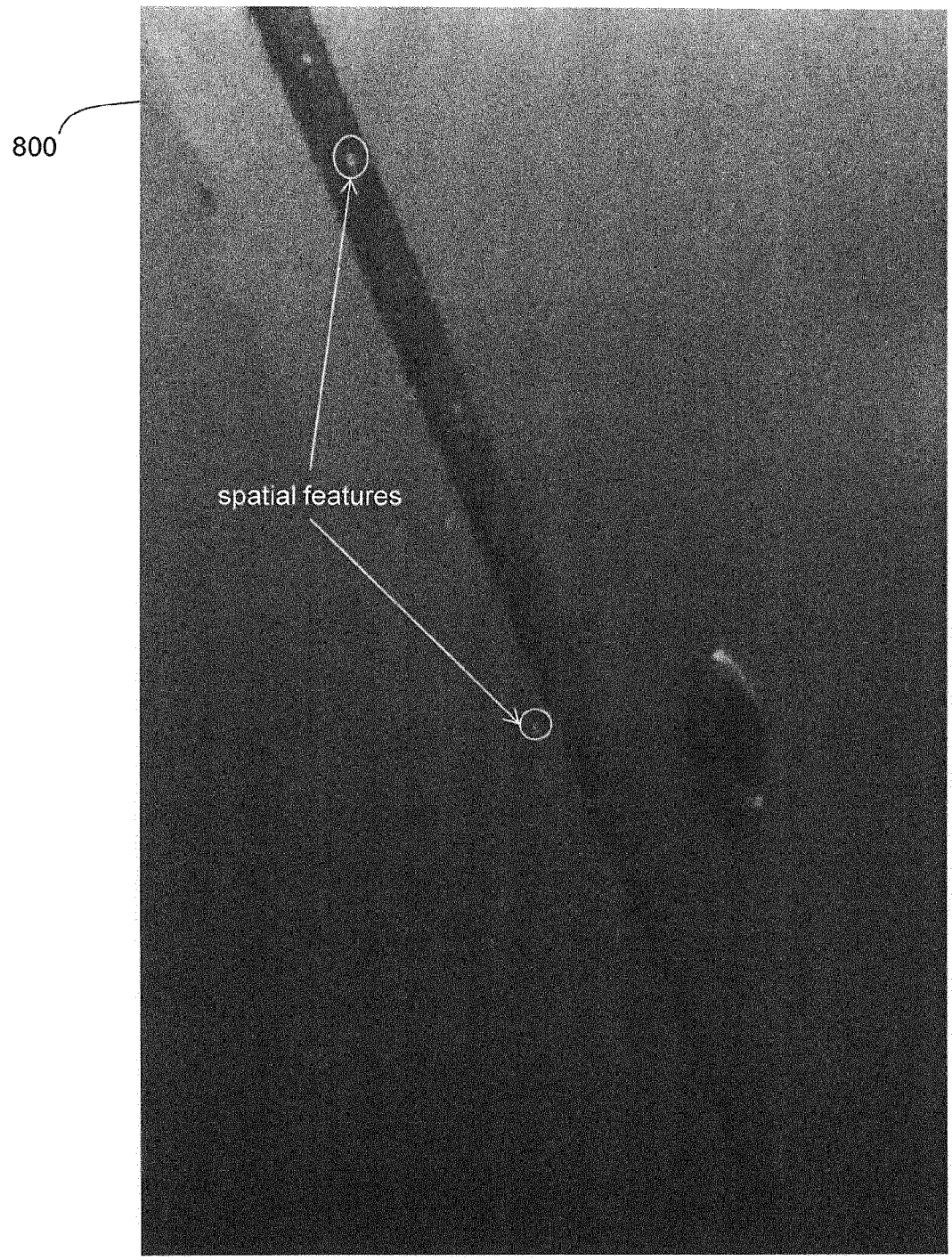
FIG. 8 illustrates an example embodiment of an image of the array of output pixels of FIG. 7 after correcting defects in the image.

FIG. 8 illustrates an example embodiment of an image 800 of the array of output pixels of FIG. 7 after correcting defects in the image. As shown in FIG. 8, both the singular defect and the clustered defect have been corrected in accordance with method 300 of FIG. 3 as implemented in the imaging device 100 of FIG. 1.

Embodiments disclosed herein are associated with detecting, verifying, and correcting defects in an image sensor output. According to one embodiment, an imaging device includes image sensor array logic, calibrated noise logic, threshold generation logic, singular defect logic, and clustered defect logic. The image sensor array logic is configured to generate an image array of output pixels in a Bayer pattern. The calibrated noise logic is configured to generate a noise estimate for each pixel.

The singular defect logic is configured to identify a pixel-under-test (from a 5×5 kernel of the image array of output pixels) as being potentially defective (e.g., due to a defective associated photo detector of the sensor array logic), verify that the pixel-under-test is actually defective, and correct the pixel-under-test. In one embodiment, the singular defect logic implements a first algorithm to perform detection, verification, and correction. The first algorithm uses thresholds generated by the threshold generation logic. Generation of the thresholds is based on noise estimates from the calibrated noise logic.

The clustered defect logic is configured to identify a pixel-under-test and another pixel (from the 5×5 kernel of the image array of output pixels) as being potentially defective (e.g., due to defective associated photo detectors of the sensor array logic), verify that the pixel-under-test and the other pixel are actually defective, and correct the pixel-under-test. In one embodiment, the clustered defect logic implements a second algorithm to perform detection, verification, and correction. The second algorithm uses thresholds generated by the threshold generation logic. Generation of the thresholds is based on noise estimates from the calibrated noise logic.

Integrated Circuit Device Embodiments

Figure 9:
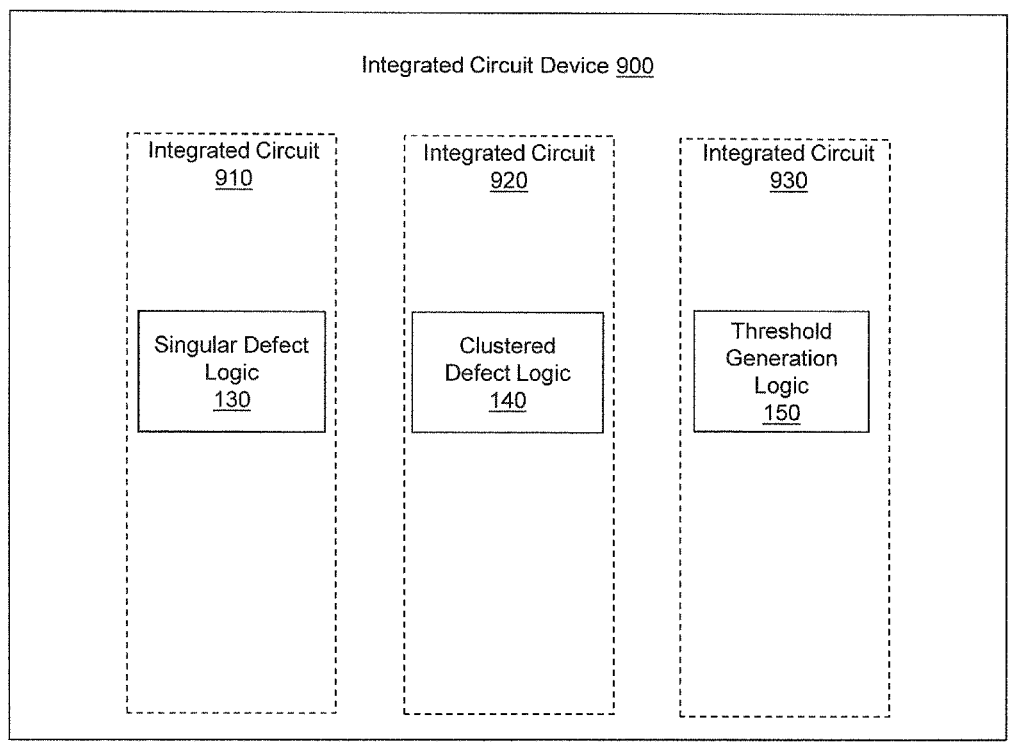
FIG. 9 illustrates one embodiment of a portion of the imaging device of FIG. 1 implemented as an integrated circuit device.

In one embodiment, the imaging device 100 may be on one or more integrated circuit chips (e.g., image signal processing chips). FIG. 9 illustrates one embodiment of a portion of the imaging device 100 of FIG. 1 implemented as an integrated circuit device 900 for correcting defective pixel outputs on-the-fly in real-time. In this embodiment, the singular defect logic 130 is embodied as a separate integrated circuit 910. Additionally, the clustered defect logic 140 is embodied on an individual integrated circuit 920. The threshold generation logic 150 is also embodied on an individual integrated circuit 930.

The circuits are connected via connection paths to communicate signals. While integrated circuits 910, 920, and 930 are illustrated as separate integrated circuits, they may be integrated into a common integrated circuit device 900. Additionally, integrated circuits 910, 920, and 930 may be combined into fewer integrated circuits or divided into more integrated circuits than illustrated.

In another embodiment, the singular defect logic 130, the clustered defect logic 140, and the threshold generation logic 150 (which are illustrated in integrated circuits 910, 920, and 930, respectively) may be combined into a separate application-specific integrated circuit. In other embodiments, portions of the functionality associated with the singular defect logic 130, the clustered defect logic 140, and the threshold generation logic 150 may be embodied as firmware executable by a processor and stored in a non-transitory memory (e.g., a non-transitory computer storage medium).

Figure 10:
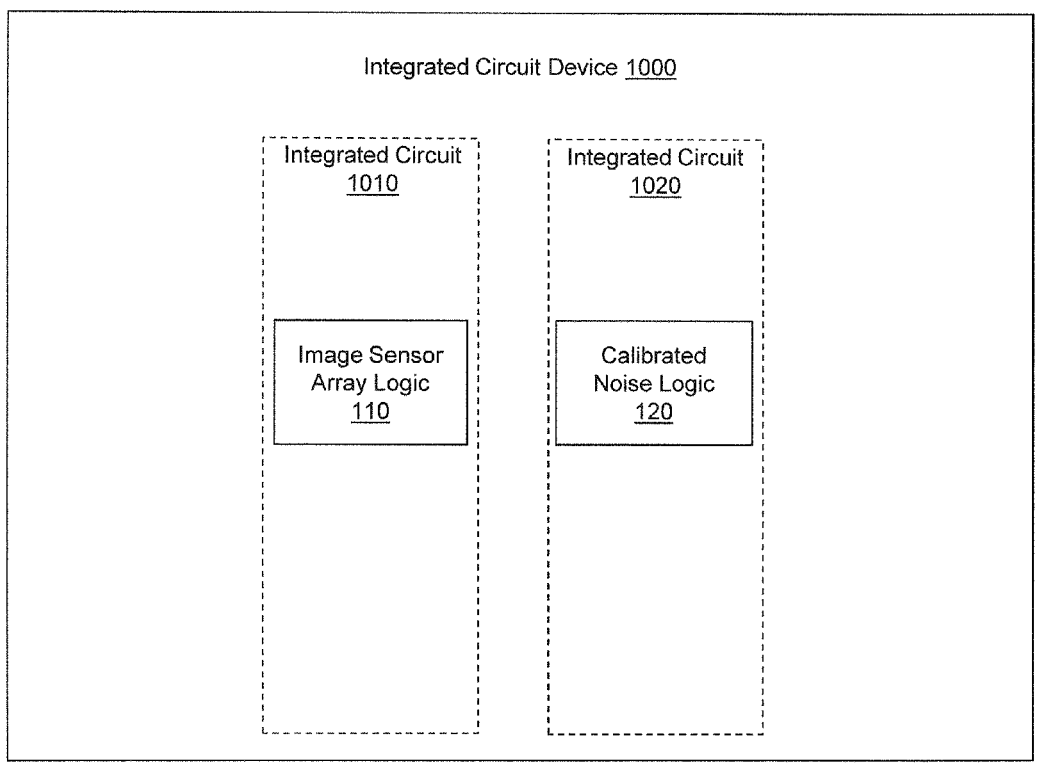
FIG. 10 illustrates one embodiment of another portion of the imaging device of FIG. 1 implemented as an integrated circuit device.

FIG. 10 illustrates one embodiment of another portion of the imaging device 100 of FIG. 1 implemented as an integrated circuit device 1000 for correcting defective pixels outputs on-the-fly in real-time. In this embodiment, the image sensor array logic 110 is embodied as a separate integrated circuit 1010. Additionally, the calibrated noise logic 120 is embodied on an individual integrated circuit 1020.

The circuits are connected via connection paths to communicate signals. While integrated circuits 1010 and 1020 are illustrated as separate integrated circuits, they may be integrated into a common integrated circuit device 1000. Additionally, integrated circuits 1010 and 1020 may be combined into fewer integrated circuits or divided into more integrated circuits than illustrated.

In another embodiment, the image sensor array logic 110 and the calibrated noise logic 120 (which are illustrated in integrated circuits 1010 and 1020, respectively) may be combined into a separate application-specific integrated circuit. In other embodiments, portions of the functionality associated with the image sensor array logic 110 and the calibrated noise logic 120 may be embodied as firmware executable by a processor and stored in a non-transitory memory (e.g., a non-transitory computer storage medium).

Figure 11:
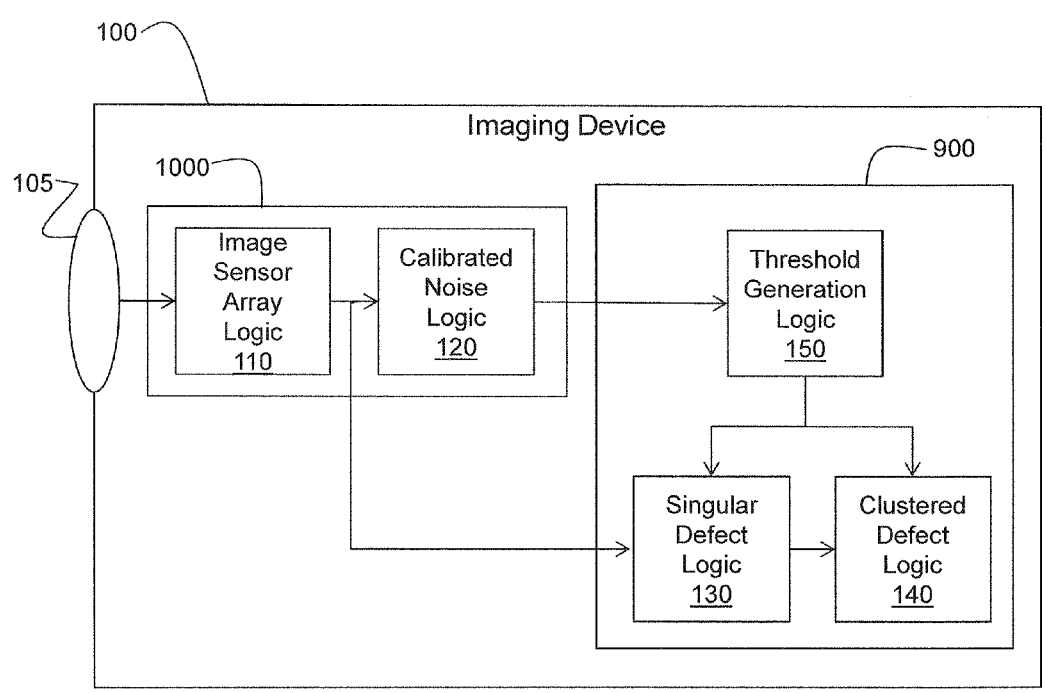
FIG. 11 illustrates one embodiment of the imaging device of FIG. 1 implemented with the integrated circuit devices of FIG. 9 and FIG. 10.

In accordance with one embodiment, the integrated circuit device 900 and the integrated circuit device 1000 are implemented in a single imaging device 100, as shown in FIG. 11, and are connected via connection paths to communicate signals. In another embodiment, the integrated circuits 910, 920, 930, 1010, and 1020 may be combined into a single integrated circuit device and are connected via connection paths to communicate signals.

Definitions and Other Embodiments

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

What is claimed is:

1. An imaging device comprising:
    an image sensor array circuit configured to generate an image array of output pixels in a Bayer pattern;
    a calibrated noise circuit configured to generate a noise estimate for a pixel-under-test in the image array of output pixels; and
    a clustered defect circuit configured to detect at least two potential defects in the image array of output pixels by:
        inputting a kernel of the image array of output pixels having the pixel-under-test at a center location of the kernel,
        determining a maximum pixel value and a minimum pixel value from pixels within the kernel that surround the pixel-under-test which corresponds to a same color channel type as the pixel-under-test,
        determining a second largest pixel value and a second smallest pixel value from the pixels within the kernel that surround the pixel-under-test which correspond to a same color channel type as the pixel-under-test,
        generating a first difference value by subtracting the second largest pixel value from the value of the pixel-under-test,
        generating a second difference value by subtracting the second largest pixel value from the maximum pixel value,
        generating a third difference value by subtracting the value of the pixel-under-test from the second smallest pixel value,
        generating a fourth difference value by subtracting the minimum pixel value from the second smallest pixel value,
        identifying the pixel-under-test and a first pixel corresponding to the maximum pixel value as being potentially defective by determining when the first difference value and the second difference value are each greater than a given threshold value that is based on a noise estimate for the pixel-under-test, and
        identifying the pixel-under-test and a second pixel corresponding to the minimum pixel value as being potentially defective by determining when the third difference value and the fourth difference value are each greater than the given threshold value.

2. The imaging device of claim 1, wherein the clustered defect circuit is configured to verify that the pixel-under-test and one of the first pixel and the second pixel are actually defective when an intermediate pixel, having a different color channel type and being located between the pixel-under-test and one of the first pixel and the second pixel within the kernel, has been determined to not be defective by the singular defect circuit.

3. The imaging device of claim 2, wherein the clustered defect circuit is configured to correct the pixel-under-test, when the pixel-under-test and one of the first pixel and the second pixel are verified as being actually defective, by replacing the value of the pixel-under-test with one of the second largest pixel value or the second smallest pixel value.

4. A computer-implemented method performed by a computing device where the computing device includes at least a processor for executing instructions from a memory, the method comprising:
- generating, via at least a processor, an image array of output pixels in a Bayer pattern;
- generating, via at least the processor, a noise estimate for a pixel-under-test in the image array of output pixels;
- inputting, via at least the processor, a kernel of the image array of output pixels having the pixel-under-test at a center location of the kernel;
- determining, via at least the processor, a maximum pixel value and a minimum pixel value from pixels within the kernel that surround the pixel-under-test which correspond to a same color channel type as the pixel-under-test;
- determining, via at least the processor, a second largest pixel value and a second smallest pixel value from the pixels within the kernel that surround the pixel-under-test which correspond to a same color channel type as the pixel-under-test;
- generating, via at least the processor, a first difference value by subtracting the second largest pixel value from the value of the pixel-under-test;
- generating, via at least the processor, a second difference value by subtracting the second largest pixel value from the maximum pixel value;
- generating, via at least the processor, a third difference value by subtracting the value of the pixel-under-test from the second smallest pixel value;
- generating, via at least the processor, a fourth difference value by subtracting the minimum pixel value from the second smallest pixel value;
- identifying, via at least the processor, the pixel-under-test and a first pixel corresponding to the maximum pixel value as being potentially defective by determining when the first difference value and the second difference value are each greater than a given threshold value that is based on a noise estimate for the pixel-under-test; and
- identifying, via at least the processor, the pixel-under-test and a second pixel corresponding to the minimum pixel value as being potentially defective by determining when the third difference value and the fourth difference value are each greater than the given threshold value.

5. The imaging device of claim 1, further comprising a singular defect circuit configured to detect a potential defect in the pixel-under-test by:
- inputting the kernel of the image array of output pixels having the pixel-under-test at a center location of the kernel;
- determining the maximum pixel value and the minimum pixel value from pixels within the kernel that surround the pixel-under-test which correspond to a same color channel type as the pixel-under-test;
- generating a fifth difference value by subtracting the maximum pixel value from the value of the pixel-under-test;
- generating a sixth difference value by subtracting the value of the pixel-under-test from the minimum pixel value; and
- identifying the pixel-under-test as being potentially defective by determining that at least one of the fifth difference value and the sixth difference value is greater than the given threshold value.

6. The imaging device of claim 5, wherein the singular defect circuit is configured to verify that the pixel-under-test is actually defective, when the pixel-under-test corresponds to a light green color channel, by:
- generating a plurality of absolute difference values by subtracting the value of the pixel-under-test from a pixel value of each of a plurality of nearest dark green pixel color channels immediately surrounding the pixel-under-test, within the kernel, and taking an absolute value; and
- identifying the pixel-under-test as being actually defective by determining that at least most of the plurality of absolute difference values are greater than a specified threshold value.

7. The imaging device of claim 6, wherein the singular defect circuit is configured to correct the pixel-under-test, when the pixel-under-test is identified as being actually defective, by replacing the value of the pixel-under-test with one of the maximum pixel value or the minimum pixel value.

8. The imaging device of claim 5, wherein the singular defect circuit is configured to verify that the pixel-under-test is actually defective, when the pixel-under-test corresponds to a dark green color channel, by:
- generating a plurality of absolute difference values by subtracting the value of the pixel-under-test from a pixel value of each of a plurality of nearest light green pixel color channels immediately surrounding the pixel-under-test, within the kernel, and taking an absolute value; and
- identifying the pixel-under-test as being actually defective by determining that at least most of the plurality of absolute difference values are greater than a specified threshold value.

9. The imaging device of claim 8, wherein the singular defect circuit is configured to correct the pixel-under-test, when the pixel-under-test is identified as being actually defective, by replacing the value of the pixel-under-test with one of the maximum pixel value or the minimum pixel value.

10. The imaging device of claim 5, wherein the singular defect circuit is configured to verify that the pixel-under-test is actually defective, when the pixel-under-test corresponds to one of a red color channel or a blue color channel, by:
- generating a first average value from pixel values of a plurality of nearest pixels that surround the pixel-under-test, within the kernel, which correspond to a plurality of nearest green color channels;
- generating a second average value from pixel values of a plurality of farthest pixels that surround the pixel-under-test, within the kernel, which correspond to a plurality of farthest green color channels;
- generating a bright defect difference value by subtracting the second average value from the first average value;
- generating a dark defect difference value by subtracting the first average value from the second average value; and
- identifying the pixel-under-test as being actually defective by determining at least one of:
  (i) the bright defect difference value being less than a specified threshold value, or
  (ii) the dark defect difference value being less than a specified threshold value.

11. The imaging device of claim 10, wherein the singular defect circuit is configured to correct the pixel-under-test, when the pixel-under-test is identified as being actually defective, by replacing the value of the pixel-under-test with one of the maximum pixel value or the minimum pixel value.

12. The imaging device of claim 1, wherein the imaging device is in the form of an integrated circuit device.

13. The method of claim 4, further comprising detecting a potential defect in the pixel-under-test of the image array of output pixels by:
   generating a fifth difference value by subtracting the maximum pixel value from the value of the pixel-under-test;
   generating a sixth difference value by subtracting the value of the pixel-under-test from the minimum pixel value; and
   identifying the pixel-under-test as being potentially defective by determining that at least one of the fifth difference value and the sixth difference value is greater than the given threshold value.

14. The method of claim 13, further comprising verifying that the pixel-under-test is actually defective, when the pixel-under-test corresponds to a light green color channel, by:
   generating a plurality of absolute difference values by subtracting the value of the pixel-under-test from a pixel value of each of a plurality of nearest dark green pixel color channels immediately surrounding the pixel-under-test, within the kernel, and taking an absolute value; and
   identifying the pixel-under-test as being actually defective by determining that at least most of the plurality of absolute difference values are greater than a specified threshold value.

15. The method of claim 14, further comprising correcting the pixel-under-test, when the pixel-under-test is identified as being actually defective, by replacing the value of the pixel-under-test with one of the maximum pixel value or the minimum pixel value.

16. The method of claim 13, further comprising verifying that the pixel-under-test is actually defective, when the pixel-under-test corresponds to a dark green color channel, by:
   generating a plurality of absolute difference values by subtracting the value of the pixel-under-test from a pixel value of each of a plurality of nearest light green pixel color channels immediately surrounding the pixel-under-test, within the kernel, and taking an absolute value; and
   identifying the pixel-under-test as being actually defective by determining that at least most of the plurality of absolute difference values are greater than a specified threshold value.

17. The method of claim 16, further comprising correcting the pixel-under-test, when the pixel-under-test is identified as being actually defective, by replacing the value of the pixel-under-test with one of the maximum pixel value or the minimum pixel value.

18. The method of claim 13, further comprising verifying that the pixel-under-test is actually defective, when the pixel-under-test corresponds to one of a red color channel or a blue color channel, by:
   generating a first average value from pixel values of a plurality of nearest pixels that surround the pixel-under-test, within the kernel, which correspond to a plurality of nearest green color channels;
   generating a second average value from pixel values of a plurality of farthest pixels that surround the pixel-under-test, within the kernel, which correspond to a plurality of farthest green color channels;
   generating a bright defect difference value by subtracting the second average value from the first average value;
   generating a dark defect difference value by subtracting the first average value from the second average value; and
   identifying the pixel-under-test as being actually defective by determining at least one of:
      (i) the bright defect difference value being less than a specified threshold value, or
      (ii) the dark defect difference value being less than a specified threshold value.

19. The imaging device of claim 18, further comprising correcting the pixel-under-test, when the pixel-under-test is identified as being actually defective, by replacing the value of the pixel-under-test with one of the maximum pixel value or the minimum pixel value.

\* \* \* \* \*